Patented Apr. 30, 1929.

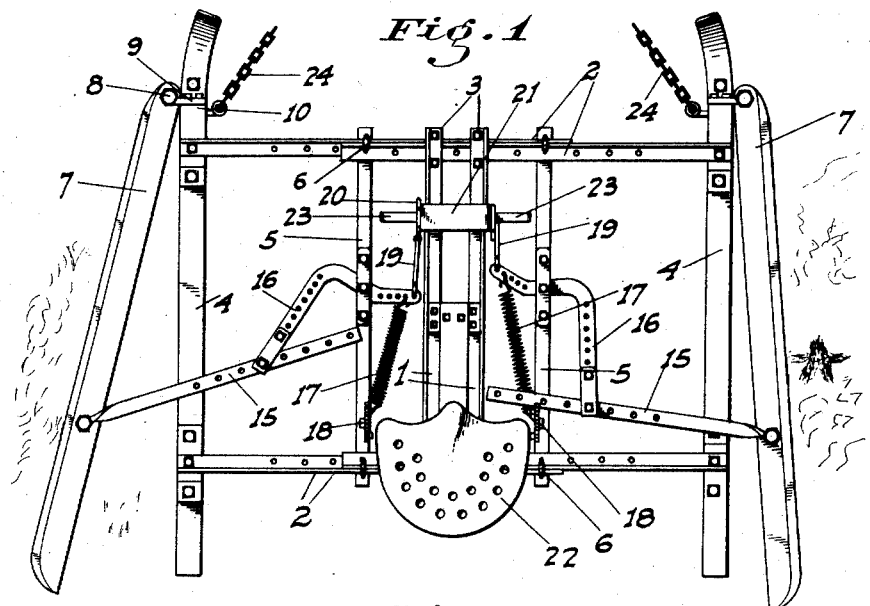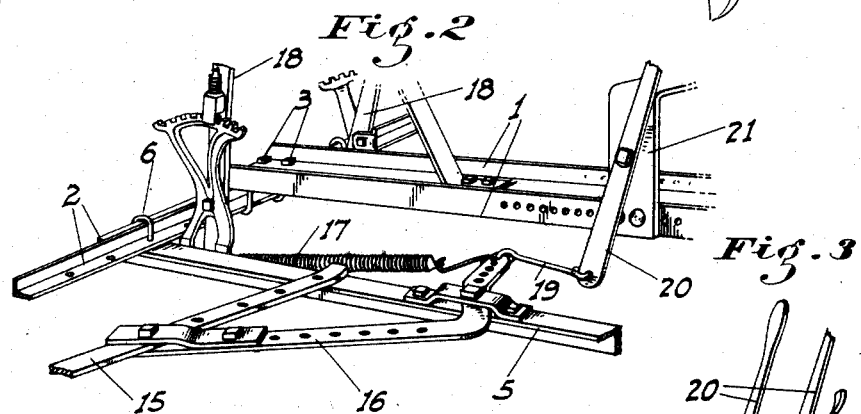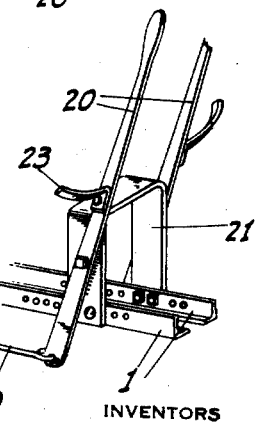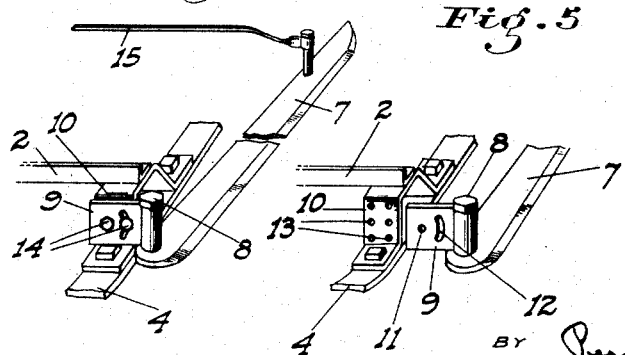

1,711,033

UNITED STATES PATENT OFFICE.

LOWELL C. SWIM, GEORGE H. OLIVAS, AND LUKE O. BREWER, OF MODESTO, CALIFORNIA.

WEED CUTTER.

Application filed August 13, 1928. Serial No. 299,230.

This invention relates to agricultural implements, our principal object being to provide an implement adapted to be drawn along the ground between rows of vines or trees, by means of which the roots of weeds adjacent both rows will be simultaneously cut off under the surface of the ground.

A further object of the invention is to provide an implement for the purpose so constructed that the cutting blades will automatically yield when they encounter a rigid obstruction such as the trunk or roots of a vine so that the latter will not be damaged. Provision is also made for enabling the blades to be retracted by hand if desired or necessary and independently of the automatic operation.

Still another object of the invention is to mount the blades on the supporting structure in such a manner that the space between the blades may be altered, and also their height and angularity relative to the ground may be independently adjusted to suit different conditions.

As a result of the use of our improved weed cutting implement, the cost of weeding operations is considerably reduced over present methods, and at the same time such operations are greatly expedited.

A further object of the invention is to produce a simple and inexpensive device and yet one which will be exceedingly effective for the purpose for which it is designed.

These objects we accomplish by means of such a structure and relative arrangement of parts as will fully appear by a perusal of the following specification and claims.

In the drawings similar characters of reference indicate corresponding parts in the several views.

Fig. 1 is a top plan view of the implement showing one blade in its normal extended position and the other retracted.

Fig. 2 is a fragmentary perspective view showing the operating and controlling connections for one blade.

Fig. 3 is a perspective view showing the hand controlled lever for manipulating a blade.

Fig. 4 is a fragmentary perspective view showing the adjustable connection of a blade with the supporting runner.

Fig. 5 is a similar view showing the blade and hinge member detached from its support.

Referring now more particularly to the characters of reference on the drawings, the numeral 1 denotes a pair of transversely spaced frame members rigidly connected together. Telescopically disposed in connection with each other at the front and rear of the frame are pairs of transversely extending bars 2; which are rigidly but adjustably connected to the frame 1 by U-bolts or similar members 3. To the outer ends of bar units 2 ground bearing shoes or runners 4 are rigidly attached, the bars 2 and runners 4 forming laterally adjustable frame structures. Longitudinally extending frame bars 5 are disposed between the runners and the frame 1 and parallel to the latter, said bars being adjustably clamped to the bars 2 by hook bolts 6 or the like.

In this manner when said members 2 are extended relative to each other the bars 5 may be maintained in the same spaced relation to the frames 1 by loosening the bolts 6 while said bars 2 are being moved in or out.

Extending rearwardly from adjacent the front end of the runners and normally diverging therefrom are flat cutting blades 7 which are sharpened along their outer edges. Each blade is pivoted at its forward end as shown at 8 on a vertical and laterally extending plate 9, which abuts against a laterally disposed plate 10 fixed on and upstanding from the adjacent runner.

The plate 9 has a single bolt hole 11 and a bolt slot 12 concentric therewith, while the plate 10 has a pair of transversely spaced vertical row of holes 13, the space between the rows being the same as the space between the slot and hole 11. Bolts 14 are placed through said slot and hole in the plate 9 and through any corresponding pair of holes in the plate 10 to hold the plate 9 rigid thereagainst, and it will be seen that said plate 9 may be set at a number of different vertical positions so as to alter the level of the blade relative to the runner. It will also be seen that the plate 9 may be angled to different degrees relative to the plate 10 and the runners owing to the provision of the curved slot 12 concentric with the hole 11, which allows the plate 9 (when the bolts are loosened) to be swung about the bolt in the hole 11 as an axis and then clamped at any desired angle within the limits of extent of the slot. The blades may thus be set to cut at various levels relative to the ground and the extent to which they will hold in the ground can be regulated by the angle by which said blades are set.

The control means for both blades is identical in operation and construction and since such means are entirely independent of each other, only one will be described. Projecting inwardly and laterally from each blade intermediate its ends is a rigid link 15 which is pivotally connected to the blade some height about the same as shown in Fig. 4 so as not to obstruct weeds and the like passing over the blade. Towards its inner end the link is connected to one end of a bell crank member 16 which is pivoted on the adjacent bar 5.

Inwardly of said pivot a rearwardly extending tension spring 17 is connected at one end to said member 16, the other end of the spring being connected to a vertical hand lever 18 which is pivoted on the bar 5 and by means of which the tension of the spring may be altered as will be evident. These parts are so arranged that the spring normally acts to hold the blade extended, but upon the blade striking an obstruction it can move in toward the frame so as to pass by such obstruction.

A forwardly extending link 19 is connected to the inner end of the member 16, which link is connected to the lower end of a vertical hand lever 20 which is pivoted intermediate its ends on the corresponding side of a rigid yoke 21 which projects upwardly from the central frame 1. This yoke is disposed a certain distance ahead of the driver's seat 22 which is also mounted on the frame 1. This distance is such as to enable the feet of the driver to rest conveniently in stirrups 23 projecting laterally from the levers 20 above the pivots thereof, and to also enable the driver to grasp and manipulate said levers without leaving his seat. By means of this arrangement either blade may be positively drawn in or retracted against the tension of the springs whenever desired.

The arms 15 are provided with a row of holes therealong as shown so that the angle of divergence of the blades may be altered, and also to enable any angle to which the blades are initially set to be maintained when the supporting bars 2 are moved to or from each other. Draft connections 24 for attachment to a draft animal are applied to the runners at their inner forward ends as shown.

From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described our invention what we claim as new and useful and desire to secure by Letters Patent is:

1. A weed cutter including a supporting structure to be drawn along the ground, blades pivoted at their forward ends on said structure and extending rearwardly in normally diverging relation to the line of movement of the structure and means yieldably maintaining the blades in such diverging relationship.

2. A device as in claim 1, with means provided with the pivot means of the blades for altering the height of the blades relative to the structure.

3. A device as in claim 1, with means for attaching the blades on to the supporting structure in a manner to enable the height of said blades relative to the structure, and independently the angles of setting of the blades in a vertical transverse plane, to be altered at will.

4. A structure as in claim 1, with means for enabling the angle of divergence of the blades to be altered without affecting said yieldable means.

5. A weed cutter including a supporting structure to be drawn along the ground, blades pivoted at their forward ends on said structure and extending rearwardly in normally diverging relation to the line of movement of the structure, a link projecting inwardly from each blade intermediate its ends, a bellcrank member pivoted on the structure and connected at one end to the link, and a tension spring connected at one end to the other end of said member and at the other end to the supporting structure.

6. A weed cutter including a supporting structure to be drawn along the ground, blades pivoted at their forward ends on said structure and extending rearwardly in normally diverging relation to the line of movement of the structure, a tension spring for holding each blade in such diverging relationship, and means for altering the normal tension of the spring at will without affecting the angle of setting of the blades.

7. A weed cutter including a supporting structure to be drawn along the ground, said structure including longitudinal ground bearing runners, a transverse plate fixed on and upstanding from each runner, said plate having transversely spaced vertical rows of holes, a hinge plate abutting against the fixed plate, said hinge plate having a bolt hole and a bolt slot concentric with the hole, the spacing between said hole and slot being the same as that between the rows of holes; bolts through said slot and hole and corresponding ones of said rows of holes, and a horizontal cutting blade pivoted on the hinge plate, the axis of the pivot being in a substantially vertically plane.

8. A structure as in claim 5, with hand operated means applied to said bell crank for moving the same against the resistance of the spring to draw the blade inwardly.

In testimony whereof we affix our signatures.

LOWELL C. SWIM.
GEORGE H. OLIVAS.
LUKE O. BREWER.